United States Patent
Centofanti

(10) Patent No.: US 11,788,665 B2
(45) Date of Patent: Oct. 17, 2023

(54) INDICATOR CAP FOR PIPE PENETRATIONS

(71) Applicant: PIPETAG PTY LTD, Glossop (AU)

(72) Inventor: Steven Centofanti, Berri (AU)

(73) Assignee: PIPETAG PTY LTD, South Australia (AU)

( * ) Notice: Subject to any disclaimer, the term of this patent is extended or adjusted under 35 U.S.C. 154(b) by 73 days.

(21) Appl. No.: 17/599,293

(22) PCT Filed: Apr. 3, 2020

(86) PCT No.: PCT/AU2020/000028
§ 371 (c)(1),
(2) Date: Sep. 28, 2021

(87) PCT Pub. No.: WO2020/198780
PCT Pub. Date: Oct. 8, 2020

(65) Prior Publication Data
US 2022/0154869 A1 May 19, 2022

(30) Foreign Application Priority Data
Apr. 5, 2019 (AU) ................................ 2019901181

(51) Int. Cl.
*F16L 57/00* (2006.01)
*E04G 21/24* (2006.01)
(Continued)

(52) U.S. Cl.
CPC ............ *F16L 57/005* (2013.01); *E04G 21/24* (2013.01); *F16L 55/115* (2013.01); *G01V 3/081* (2013.01); *G01V 15/00* (2013.01)

(58) Field of Classification Search
CPC .. F16L 1/11; F16L 55/11; F16L 55/115; F16L 57/00; F16L 57/005; B65D 59/06; E04G 21/24; G01V 15/00
(Continued)

(56) References Cited

U.S. PATENT DOCUMENTS 3,431,012 A 3/1969 Courtois et al.
4,017,115 A 4/1977 Holt et al.
(Continued)

FOREIGN PATENT DOCUMENTS

AU 2009217480 B2 4/2010
EP 1353015 A3 10/2003

OTHER PUBLICATIONS

International Search Report for PCT Application No. PCT/AU2020/000028 dated May 28, 2020 (5 pages).
(Continued)

*Primary Examiner* — Patrick F Brinson
(74) *Attorney, Agent, or Firm* — Merchant & Gould, P.C.

(57) ABSTRACT

This disclosure relates to an indicator cap for a pipe penetration. In one aspect, the indicator cap comprises a cap body, wherein the cap body comprises an engagement portion for engaging the indicator cap with the pipe, and a capping portion connected to the engagement portion for covering an open end of the pipe, and wherein a surface of the capping portion supports a means for aiding location of the indicator cap and thus the pipe, wherein the means for aiding location is adapted so as to not impede screeding thereover, and to indicate the position of the cap and thus the pipe post screeding.

18 Claims, 22 Drawing Sheets

(51) Int. Cl.
*F16L 55/115* (2006.01)
*G01V 3/08* (2006.01)
*G01V 15/00* (2006.01)

(58) Field of Classification Search
USPC ............... 138/104, 89, 96 R, 96 T; 405/157; 52/220.8, 105; 285/93
See application file for complete search history.

(56) References Cited

U.S. PATENT DOCUMENTS

| | | | |
|---|---|---|---|
| 4,915,055 A | | 4/1990 | Ptashinski |
| 5,003,735 A | | 4/1991 | Bates |
| 5,044,303 A | * | 9/1991 | Culver, Jr. ............... F16L 1/11 405/157 |
| 5,623,971 A | * | 4/1997 | Foernzler ............. E03F 5/0407 138/104 |
| 6,049,279 A | | 4/2000 | Minarovic |
| 7,391,324 B1 | | 6/2008 | Pflugrath et al. |
| 8,646,488 B1 | | 2/2014 | Shindelar et al. |
| 10,047,894 B2 | | 8/2018 | Williams et al. |
| 2005/0200484 A1 | | 9/2005 | Minarovic |
| 2006/0006252 A1 | | 1/2006 | Wilson |
| 2008/0314468 A1 | | 12/2008 | Houghton |
| 2010/0037969 A1 | | 2/2010 | Fierst et al. |
| 2010/0139206 A1 | | 6/2010 | Minarovic |
| 2011/0146563 A1 | | 6/2011 | Crawford et al. |
| 2014/0260015 A1 | | 9/2014 | McConnell et al. |
| 2017/0268712 A1 | | 9/2017 | Williams et al. |

OTHER PUBLICATIONS

Written Opinion for PCT Application No. PCT/AU2020/000028 dated May 28, 2020 (5 pages).
Extended European Search Report for EP20783045.6, dated Dec. 5, 2022.

* cited by examiner

INDICATOR CAP FOR PIPE PENETRATIONS

PRIORITY DOCUMENTS

The present application is a National Stage Application of PCT/AU2020/000028, filed 3 Apr. 2020, which claims priority from Australian Provisional Patent Application No. 2019901181 titled "INDICATOR CAP FOR PIPE PENETRATIONS" and filed on 5 Apr. 2019, the content of which are hereby incorporated by reference in their entirety.

TECHNICAL FIELD

The present disclosure relates to an indicator cap for pipe penetrations. In particular, the present disclosure relates to an indicator cap for pipe projections such as plumbing, electrical or telecommunications conduits used in concrete slabs.

BACKGROUND

A concrete slab is commonly the base for a vast range of structures. During the pouring of a slab, submerged pipes will have exposed penetrations that extend above surface of the slab, allowing for subsequent connection or access. These pipe penetrations may serve as a variety of conduits for future plumbing, electrical, gas and telecommunications installations.

Typically, the pipe projections are positioned to substantially extend above the intended surface of the slab, prior to pouring the cement to be levelled and compacted. With the submerged pipes and their respective pipe penetrations in place, the required amount of concrete is poured. It is then necessary to level poured cement to the height of the forms (the designed top of the slab, or the finished floor level). This process of levelling concrete is commonly referred to as screeding. Levelling concrete via screeding is accomplished, in its simplest form, by either the manual process of moving a flat material in a back and forth manner, or with the use of a powered concrete levelling device (such as a helicopter trowelling machine). The screeding process serves to move any of the excess concrete that extends above the designed top of the slab either into any lower areas or off the prospective slab altogether.

This current process of screeding the concrete slab involves an operator screeding the concrete to obtain a level concrete slab surface by navigating pipe projections that are positioned at designed locations, and taking extra time and care around these pipe projections so as to obtain a level surface for the concrete slab. This screeding process has a number of drawbacks, such as, but not limited to:

1. the operator spending a considerable amount of time screeding to navigate the pipe projections, leading to increased costs, and increased potential of personal injury to the operator;
2. the operator poorly screeding around the pipe projections resulting in a non-level slab surface around a periphery of the pipe projections, leading to an un-even and visually unsightly concrete slab;
3. the operator unintentionally damaging the pipe projections during the screeding process and carrying out works of other trades, leading to the requirement of repair and potential recovery of the submerged pipes;
4. the pipe projections presenting trip hazards before, during and post screeding the concrete slab, potentially leading to foot, shin, ankle and other injuries as a result thereof to both operators and other personnel at the work site; and
5. the potential for wet concrete to enter an open end of the exposed pipe projections during the pouring of concrete, curing in the pipework, and causing downstream blockages.

Presently utilised solutions in an attempt to resolve at least the fifth drawback above, are to block the ends of the pipe projections with cloth rags, paper, tape and known pipe covers. However, these available solutions fail to overcome all of the above problems associated with the current screeding process.

It is against this background and the problems and difficulties associated therewith, that the present disclosure has been developed.

SUMMARY

According to a first aspect, there is provided an indicator cap for a pipe penetration, the indicator cap comprising a cap body, wherein the cap body comprises an engagement portion for engaging the indicator cap with the pipe, and a capping portion connected to the engagement portion for covering an open end of the pipe, and wherein a surface of the capping portion supports a means for aiding location of the indicator cap and thus the pipe, wherein the means for aiding location is adapted so as to not impede screeding thereover, and to indicate the position of the cap and thus the pipe post screeding.

In one form, the cap body is substantially circular.

In one form, the engagement portion is substantially circular, and comprises a pipe engaging diameter, the capping portion is substantially circular, and comprises a pipe capping diameter.

In one form, the pipe engaging diameter is substantially the same as the pipe capping diameter.

In one form, the pipe engaging diameter is less than the pipe capping diameter.

In one form, at least one of the pipe engaging diameter or the pipe capping diameter is selected in accordance with a diameter of the pipe.

In one form, the pipe engaging diameter is greater than the diameter of the pipe.

In one form, in use, the capping portion and the engagement portion cooperatively form a cavity for receiving the open end of the pipe therein.

In one form, the engagement portion and the capping portion are adapted to define a peripherally circumferential lip, substantially at the capping portion.

In one form, the pipe engaging diameter is in accordance with an inner diameter of the pipe.

In one form, in use, the circumferential lip bears against the open end of the pipe, and the engagement portion is nested and concealed in a cavity of the pipe.

In one form, the engagement portion may be snugly, abuttingly, adhesively or threadingly engaged with the pipe projection.

In one form, the engagement portion is mounted to extend substantially perpendicularly from the capping portion.

In one form, the engagement portion extends to an end of the engagement portion, the end connected to a flange.

In one form, the flange is substantially circular and comprises a flange diameter, the flange diameter is greater than both the pipe engaging diameter and the pipe capping diameter.

In one form, the flange is comprised of a meshed material.

In one form, the means for aiding location comprises a projection, wherein the projection is comprised of a resilient material.

In one form, the resilient projection is both deformable so as to not impede screeding thereover, and resilient so as to recover post screeding.

In one form, the resilient projection deforms by depressing below the surface of the capping portion so as to not impede screeding thereover, and resilient so as to recover post screeding.

In one from, the means for aiding location is integrally formed with the cap body. In an alternative, the means for aiding location is separately formed.

In one form, the resilient material comprises an elastomeric material.

In one form, the resilient material comprises a polymeric material.

In one form, the means for aiding location comprises a hemispherical projection, wherein the hemispherical projection has a diameter in accordance with the pipe capping diameter, the hemispherical projection being manufactured of a resilient material so as to not impede screeding thereover, and thereby indicating the position of the cap and thus the pipe post screeding.

In one form, the means for aiding location is manufactured of the resilient material, whereby the means for aiding location assists in removing or preventing a screeded material from settling on the surface of the capping portion of the indicator cap.

In one form, the means for aiding location is a magnet, the magnet being flush with the surface of the capping portion so as to not impede screeding thereover, and the magnet providing a magnetic force for indicating the position of the cap and thus the pipe post screeding.

In one form, the means for aiding location is a chip, such as an RFID chip, the chip being flush with the surface of the capping portion so as to not impede screeding thereover, and the chip providing a detectable signal thereby indicating the position of the cap and thus the pipe post screeding.

In one form, the cap body is manufactured from the resilient material.

In one form, the cap body is manufactured from the polymeric material.

According to a further aspect, there is provided an indicator cap for a pipe penetration, the indicator cap comprising: a cap body, the cap body comprising an engagement portion for engaging the pipe, wherein the engagement portion is substantially circular having a pipe engaging diameter, and a capping portion connected to the engagement portion for covering an open end of the pipe, wherein the capping portion is substantially circular and having a pipe capping diameter, the indicator cap further comprising a projection, the projection comprising a means for aiding location of the indicator cap and thus the pipe, wherein the projection is manufactured of a resilient material so as to not impede screeding thereover, and thereby indicating the position of the cap and thus the pipe post screeding, and wherein the projection assists in removing or preventing a screeded material from settling on a surface of the capping portion.

In one form, the engagement portion is substantially circular having a pipe engaging diameter, and the capping portion is substantially circular and having a pipe capping diameter.

In one form, the projection comprises a hollow body, thereby enhancing the biasing mechanism of the resilient material to bias the projection back to its original position.

In one form, the projection is centrally disposed on a surface of the capping portion and extends perpendicularly from the capping portion.

In one form, the projection is tubular.

In one form, the projection is cylindrical.

In one form, the projection is conical.

In one form, the projection comprises at least one flap.

In one form, the projection is semicircular.

In one form, the projection comprises a pull tab.

In one form, the pull tab comprises a handle part to be gripped by a user's finger.

In one form, the projection is deformable laterally.

In one form, the projection is deformable axially.

According to a further aspect, there is provided a method for screeding cement over and locating a pipe projection by use of the above described indicator cap, the method comprising the steps of; cutting the pipe projection such that an open end of the pipe projection is level with an intended surface of a concrete slab, installing the indicator cap on the pipe projection, pouring cement required to form the concrete slab, screeding the cement to form the intended surface of the concrete slab including screeding over the indicator cap, allowing time for the concrete slab to cure, then using the means for aiding location to locate the indicator cap and thus the pipe, and then cutting the capping portion of the indicator cap using a cutting means to expose the open end of the pipe, thereby providing a means for subsequent connection or access to the pipe.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
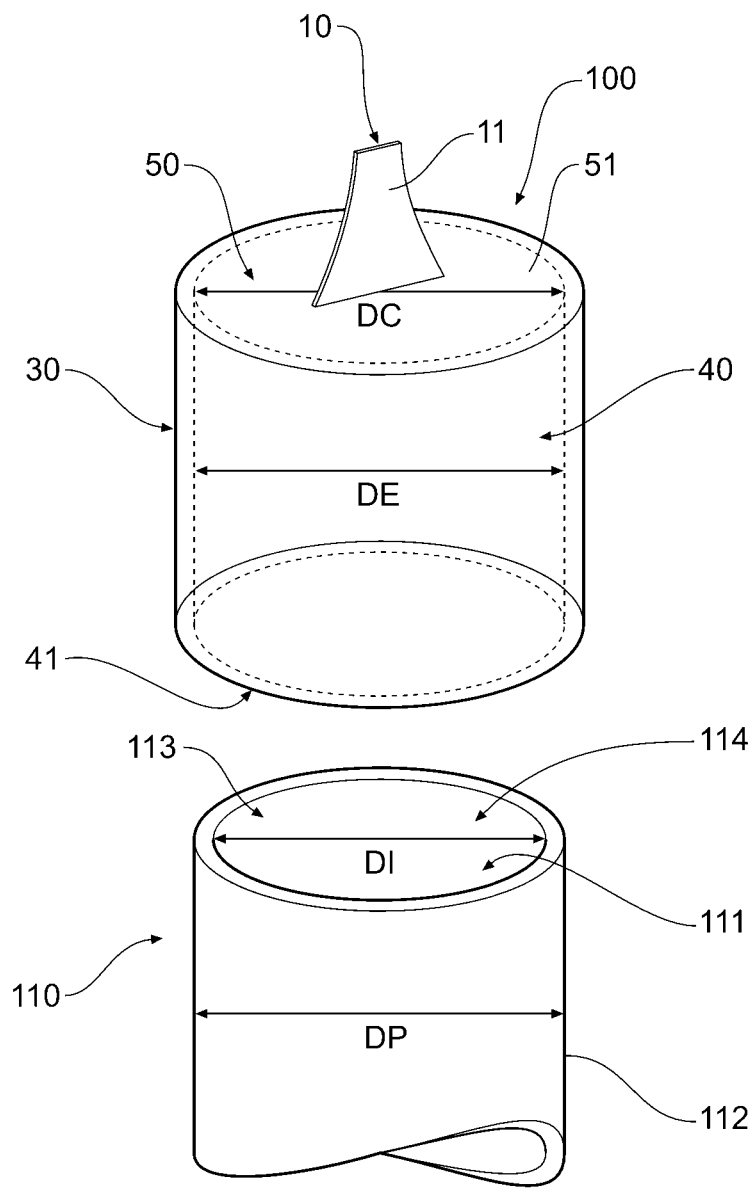
FIG. 1 is a perspective view of an embodiment of an indicator cap for a pipe penetration, the indicator cap not installed on the pipe penetration.
Figure 2:
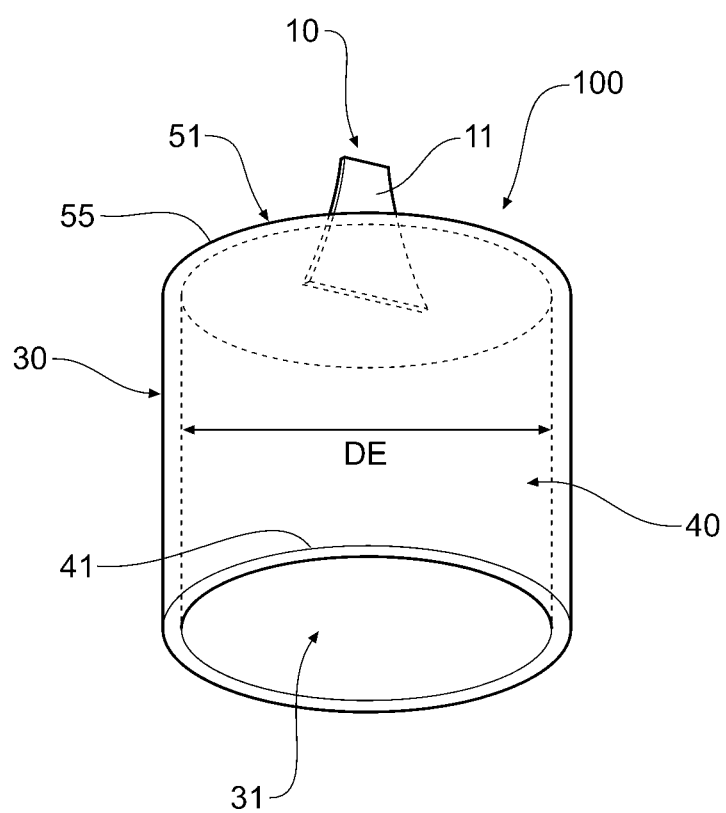
FIG. 2 is an alternative perspective view of an embodiment of the indicator cap of FIG. 1.
Figure 3:
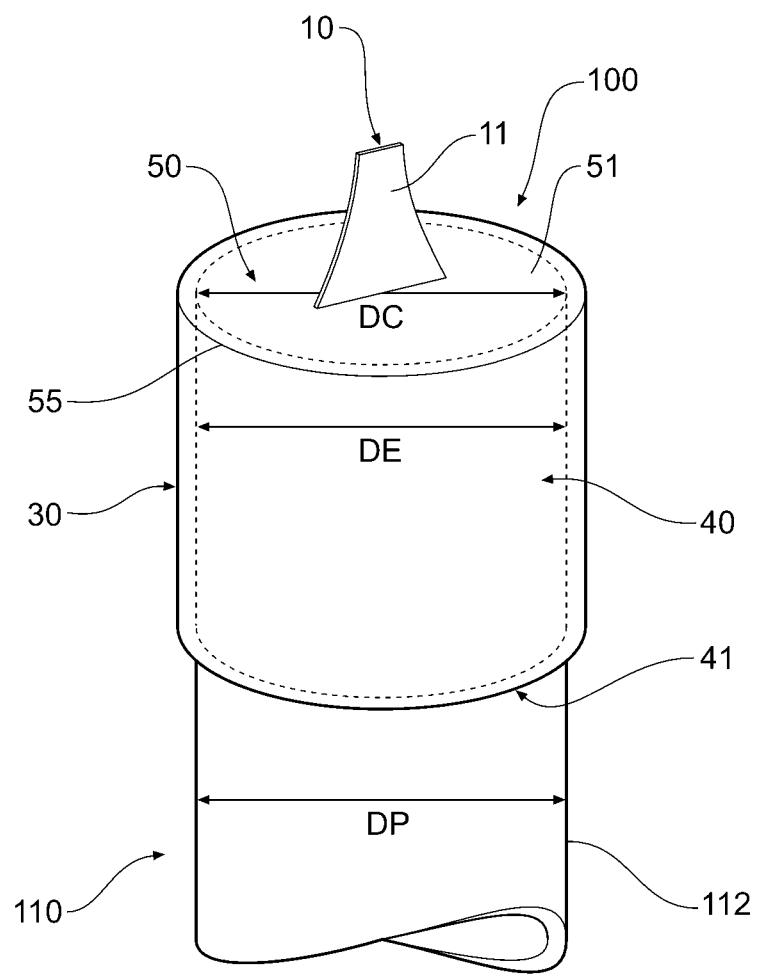
FIG. 3 is a perspective view of the indicator cap of FIG. 1 installed on the pipe penetration, where a pipe engaging diameter of the indicator cap is greater than a diameter of the pipe.

FIGS. 1 to 3 illustrate an indicator cap 100, according to an embodiment, for a pipe penetration 110. The indicator cap 100 being particularly designed to provide a means for aiding in location 10 of the indicator cap 100 and thus the pipe 110. In particular, the means for aiding in location 10 is adapted so as to not impede screeding thereover, and to indicate the position of the cap 100 and thus the pipe 110 post screeding.

Referring to the Figures, the indicator cap 100 comprises a cap body 30. The cap body 30 comprises an engagement portion 40 for engaging the indicator cap 100 with the pipe 110, and a capping portion 50 connected to the engagement portion 40 for covering an open end 111 of the pipe 110.

Furthermore, a surface 51 of the capping portion 50 supports the means for aiding location 10.

In one embodiment, the cap body 30 of the indicator cap 100 may be substantially circular. In this embodiment, the engagement portion 40 may also be substantially circular. The substantially circular engagement portion 40 may comprise a pipe engaging diameter (DE). Additionally, in this embodiment, the capping portion 50 may also be substantially circular and comprise a pipe capping diameter (DC).

Referring now to any one of FIGS. 1 to 19, in one embodiment, the pipe engaging diameter (DE) may be substantially the same as the pipe capping diameter (DC).

Referring to any one of the Figures, it will be appreciated that at least one of the pipe engaging diameters (DE) or the pipe capping diameter (DC) is selected in accordance with a diameter of the pipe (DP).

Referring to FIGS. 1 and 3 to 19, in one embodiment, the pipe engaging diameter (DE) may be greater than the diameter of the pipe (DP). In this embodiment, in use, the capping portion 50 and the engagement portion 40 form a cavity 31 (best illustrated in FIG. 2) of the cap body 30, for receiving the open end 111 (best illustrated in FIG. 1) of the pipe 110 therein. In this way, engagement portion 40 engages with an exterior 112 of the pipe 110, the capping portion 50 covers the open end 111 of the pipe 110, thereby the indicator cap 100 advantageously prevents the ingress of debris into the pipe 110.

Figure 20:
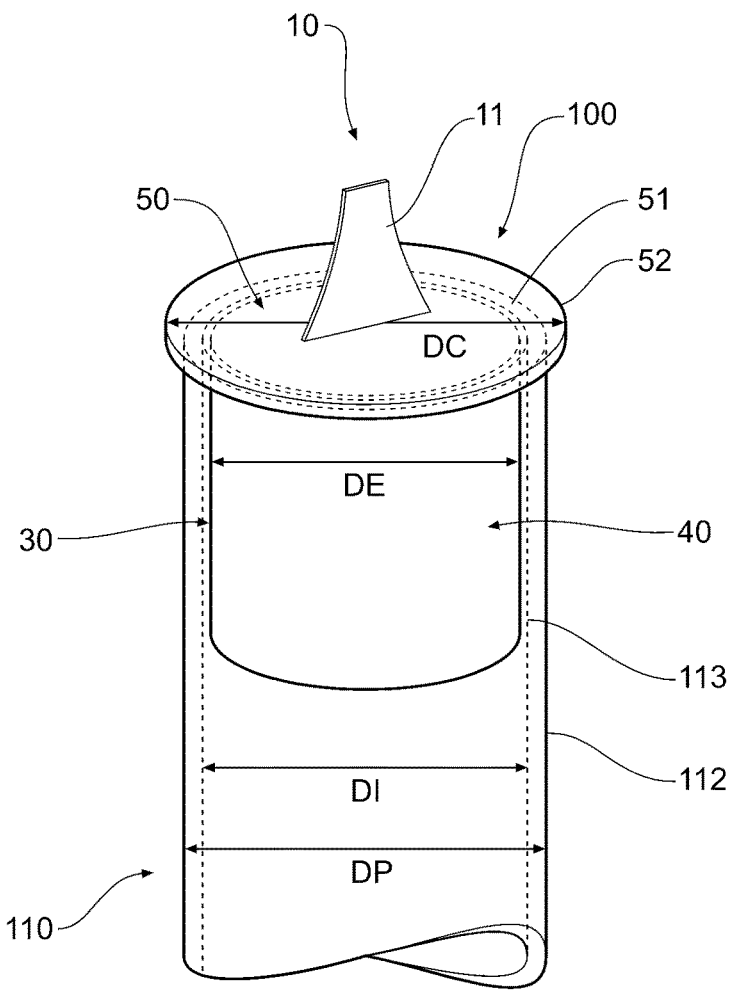
FIG. 20 is a perspective view of an alternative embodiment of an indicator cap for a pipe penetration, the indicator cap installed on the pipe projection, where a pipe engaging diameter of the indicator cap is in accordance with an inner diameter of the pipe.
Figure 21:
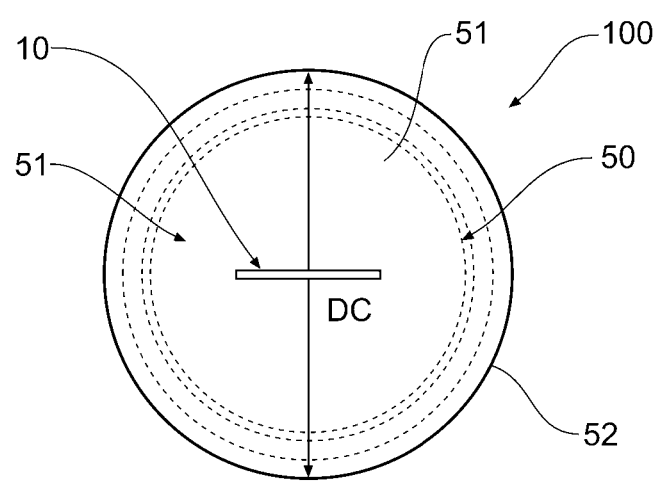
FIG. 21 is a plan view of the indicator cap installed on the pipe projection of FIG. 20.
Figure 22:
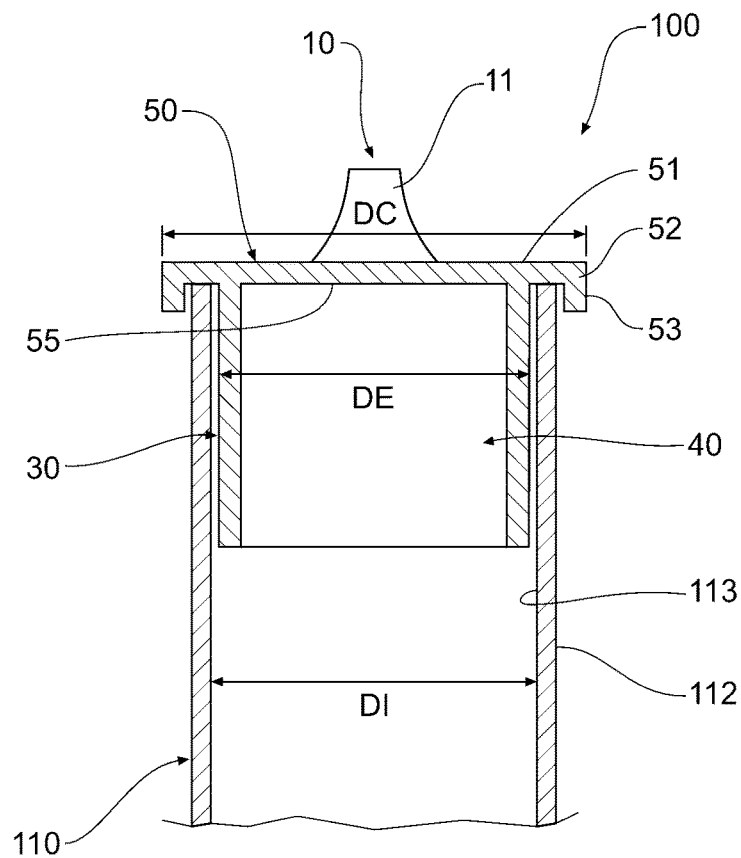
FIG. 22 is a side view of an embodiment of an indicator cap installed on a pipe penetration, where a pipe engaging diameter of the indicator cap is in accordance with an inner diameter of the pipe, and a capping portion of the pipe comprises a hook portion.

Referring now to FIGS. 20 to 22, in an alternative embodiment, the pipe engaging diameter (DE) may be less than the pipe capping diameter (DC).

In this embodiment, the engagement portion 40 and the capping portion 50 may be adapted to define a peripherally circumferential lip 52 substantially at the capping portion 50. The pipe engaging diameter (DE), in this embodiment, may be in accordance with an inner diameter (DI) of the pipe 100.

Additionally, in this embodiment, when the indicator cap 100 is in use, the peripherally circumferential lip 52 may bear against the open end 111 of the pipe 110. In this way, the engagement portion 40 of the cap body 30 may be nested and concealed in a cavity 114 (best illustrated in FIG. 1) of the pipe 110. That is, in this particular embodiment, the inner diameter (DI) of the pipe 100 may be greater than the pipe engaging diameter (DE) of the engagement portion 40. In this way, engagement portion 40 engages with an interior 113 of the pipe 110, nesting and concealing the engagement portion 40 in the cavity 114, the peripherally circumferential lip 52 bearing against the open end 111 thereby advantageously preventing the ingress of debris into the pipe 110.

In one embodiment, referring to FIG. 22, the peripherally circumferential lip 52 may comprise a hook portion 53, the hook portion 53 depending from the circumferential lip 52 thereby creating a channel between the hook portion 53 and the engagement portion 40. The channel, in use, being configured so as to sandwich the open end 111 of the pipe 110 between the hook portion 53 and the engagement portion 40 thereby advantageously additionally engaging the indicator cap 100 to the pipe penetration 110.

Referring now to any one of the Figures, in one embodiment, the engagement portion 40 may be mounted to extend substantially perpendicularly from the capping portion 50. In this way, together, the engagement portion 40 and the capping portion 50 form the cavity 31 of the cap body 30 for receiving the open end 111 of the pipe 110 therein.

Figure 18:
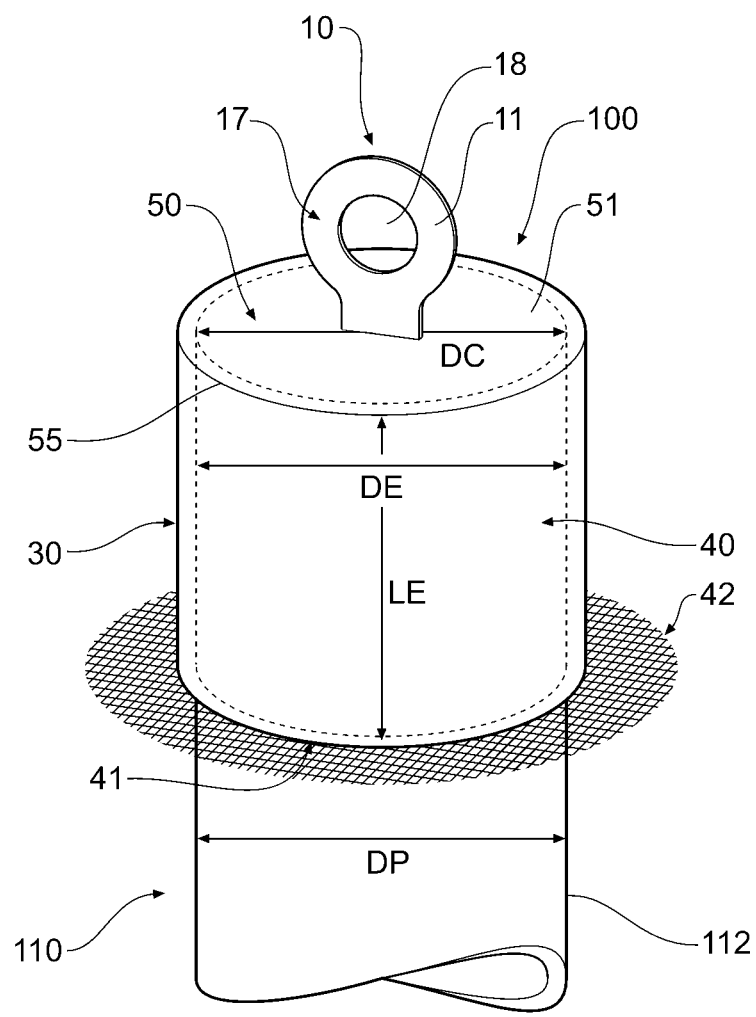
FIG. 18 is a perspective view of an embodiment of an indicator cap installed on a pipe penetration, where an engagement portion of the indicator cap extends to a length of the pipe to an end of the engagement portion, the end connected to a flange, and a means for aiding in location of the indicator cap is a pull tab comprising a handle part to be gripped by the finger of a user.
Figure 19:
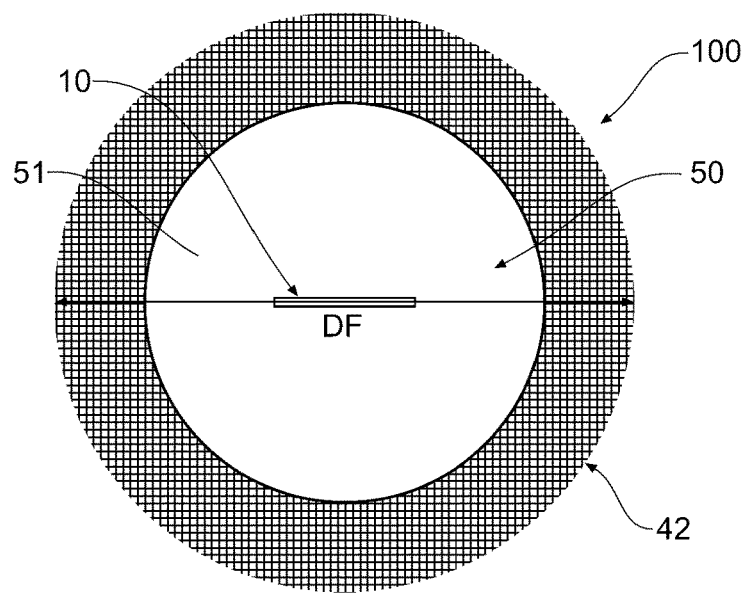
FIG. 19 is a plan view of the indicator cap of FIG. 18.

Referring now to FIGS. 18 and 19, in one embodiment, the engagement portion 40 may extend to a length (LE), the length (LE) may extend between the capping portion 50 to an end 41 of the engagement portion 40. The length (LE) may be substantially the same as a distance (not shown) between the open end 111 of the pipe 110 and an intended top of a cement slab (not shown).

In this embodiment, the end 41 of the engagement portion 40 may be connected to a flange 42. The flange 42 may be substantially circular, and outwardly extend from the end 41 of the engagement portion 40. The flange 42 may comprise a flange diameter (DF), the flange diameter (DF) may be greater than both the pipe engaging diameter (DE) and the pipe capping diameter (DC).

In one embodiment, the flange 42 may bear against the intended top of the cement slab (not shown). In this way, the flange 42 may be exposed above the intended top of the cement slab (not shown).

In an alternative embodiment, the flange 42 may be level with or below the intended top of the cement slab (not shown). In this way, the flange 42 may not be exposed above the intended top of the cement slab (not shown).

In an alternative embodiment, the length (LE) of the engagement portion 40 may be of any length less than the distance between the open end 111 of the pipe 110 and the intended top of the cement slab (not shown), provided that the length (LE) is sufficient to allow the engagement portion 40 to engage with either the exterior 112 or interior 113 of the pipe 110.

In one embodiment, the flange 42 may bear against a surface for pouring the cement slab (not shown), thereby the flange extends below the intended top of the cement slab. In this way, the flange 42 may be level with the surface for pouring the cement slab (not shown). In this particular embodiment, the length (LE) of the engagement portion 40 may extend the entire length of the pipe penetration 110.

In one embodiment, the flange 42 may further be comprised of a meshed material. In this way, the flange 42 is porous so as to advantageously permit the cement being poured for the concrete slab to pass therethrough. It will also be appreciated that the meshed flange 42 advantageously permits various material to pass through its inherent porosity. Optionally, the flange 42 may comprise an insecticide/termiticide.

Figure 4:
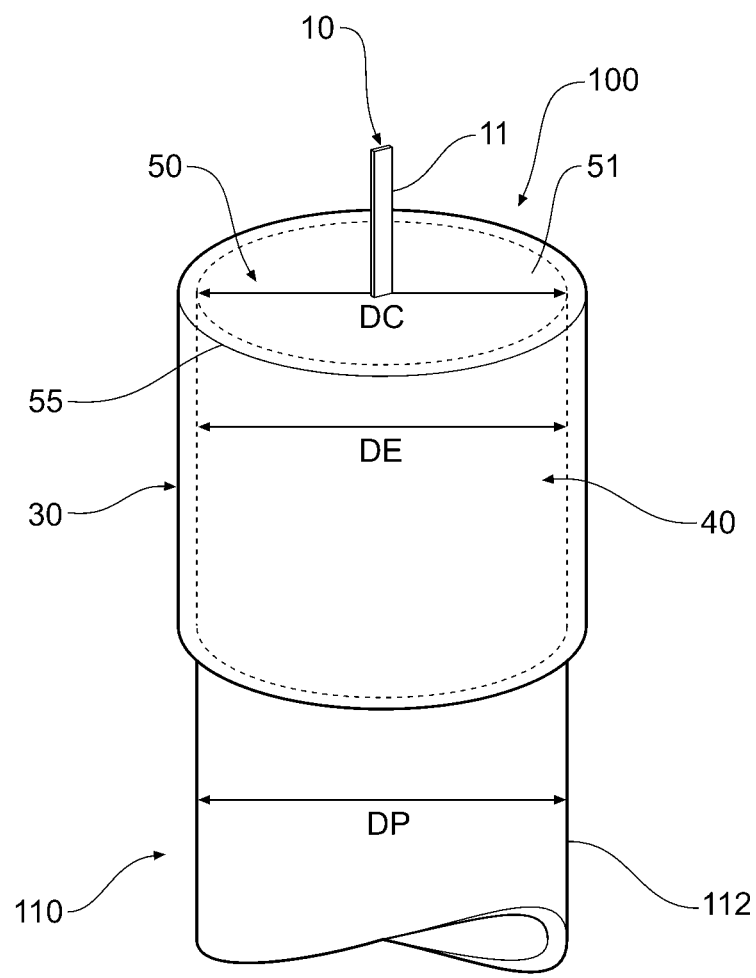
FIG. 4 is a perspective view of an embodiment of an indicator cap installed on a pipe penetration, where a means for aiding in location of the indicator cap is a projection comprised of a resilient material.

In any one of the above embodiments, wherein the end 41 of the engagement portion 40 is connected to the flange 42, and the length (LE) of the engagement portion 40 represents the distance between the open end 111 of the pipe 110 and the intended top of the cement slab, it will be appreciated by those skilled in the art that the means for aiding location 10 is still designed to provide for locating of both the indicator cap 100 and the pipe 110, but may not be particularly designed to allow screeding thereover. Referring to FIG. 4, in one embodiment, the means for aiding location 10 may comprise a projection 11. The projection 11 may be comprised of a resilient material. In this embodiment, the projection 11 is both deformable so as to not impede screeding thereover, and resilient so as to recover post screeding.

In any one of the above embodiments, a section of the engagement portion 40 may comprise a thickened wall (not shown). In this way, the section of the engagement portion 40 that comprises the thickened wall, it will be appreciated by those skilled in the art, that the pipe capping diameter (DC) is greater than the pipe engaging diameter (DE) so as to advantageously provide more rigidity to the indicator cap 100.

Figure 5:
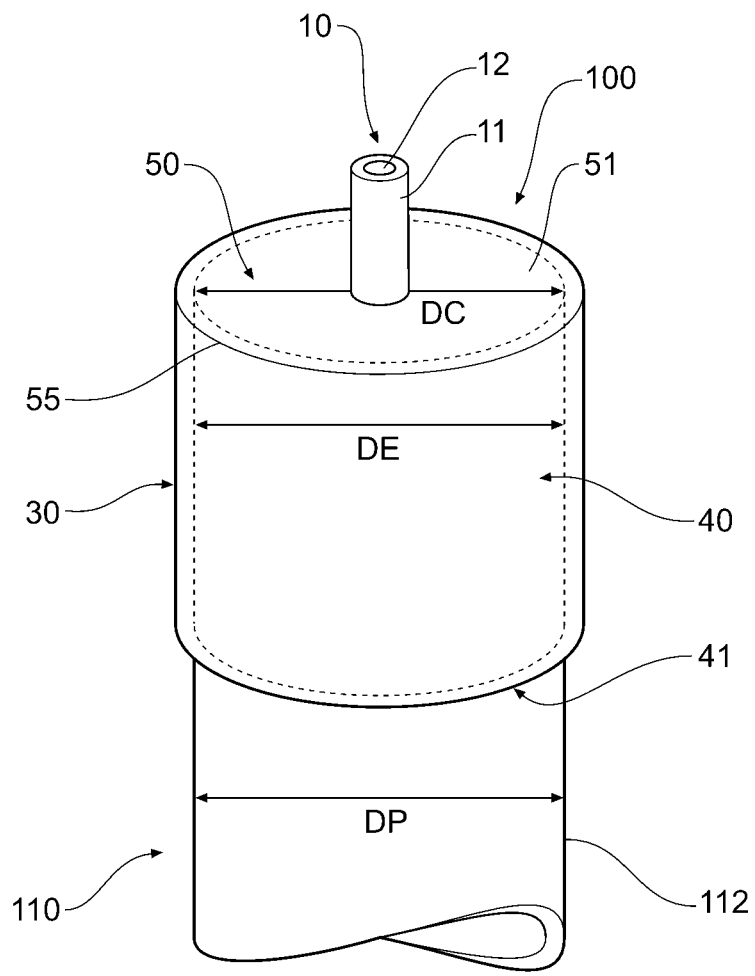
FIG. 5 is a perspective view of an embodiment of an indicator cap installed on a pipe penetration, where a means for aiding in location of the indicator cap is a tubular projection.

Referring now to FIG. 5, in one embodiment, the projection 11 may further comprise a hollow body 12. The hollow body 12 advantageously enhancing the biasing mechanism of the resilient material to bias the projection back to its original position post screeding. In this particular embodiment the projection 11 may be tubular.

In an alternative embodiment, the projection 11 may be cylindrical.

Figure 6:
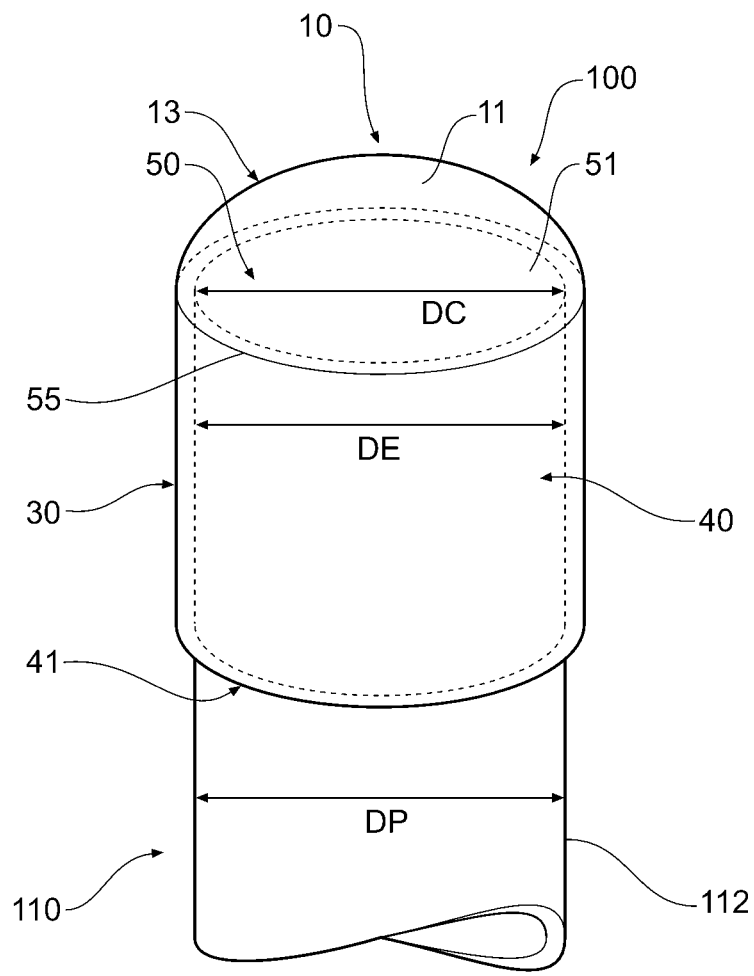
FIG. 6 is a perspective view of an embodiment of an indicator cap installed on a pipe penetration, where a means for aiding in location of the indicator cap is a projection comprising a flap.
Figure 7:
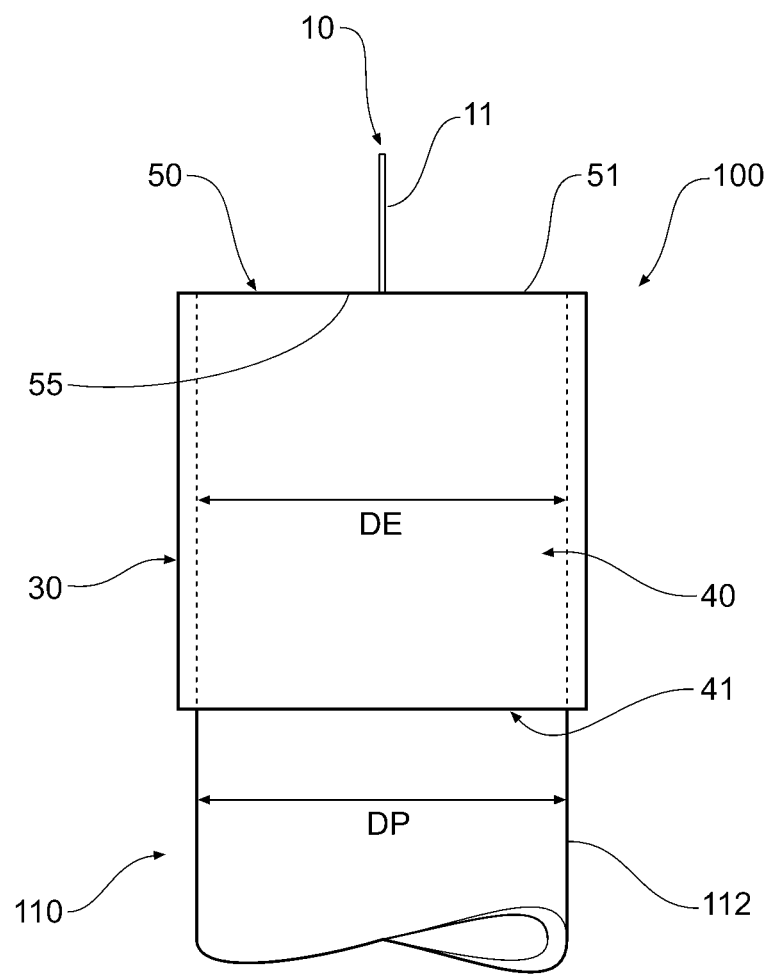
FIG. 7 is a side view of the indicator cap of FIG. 6.
Figure 8:
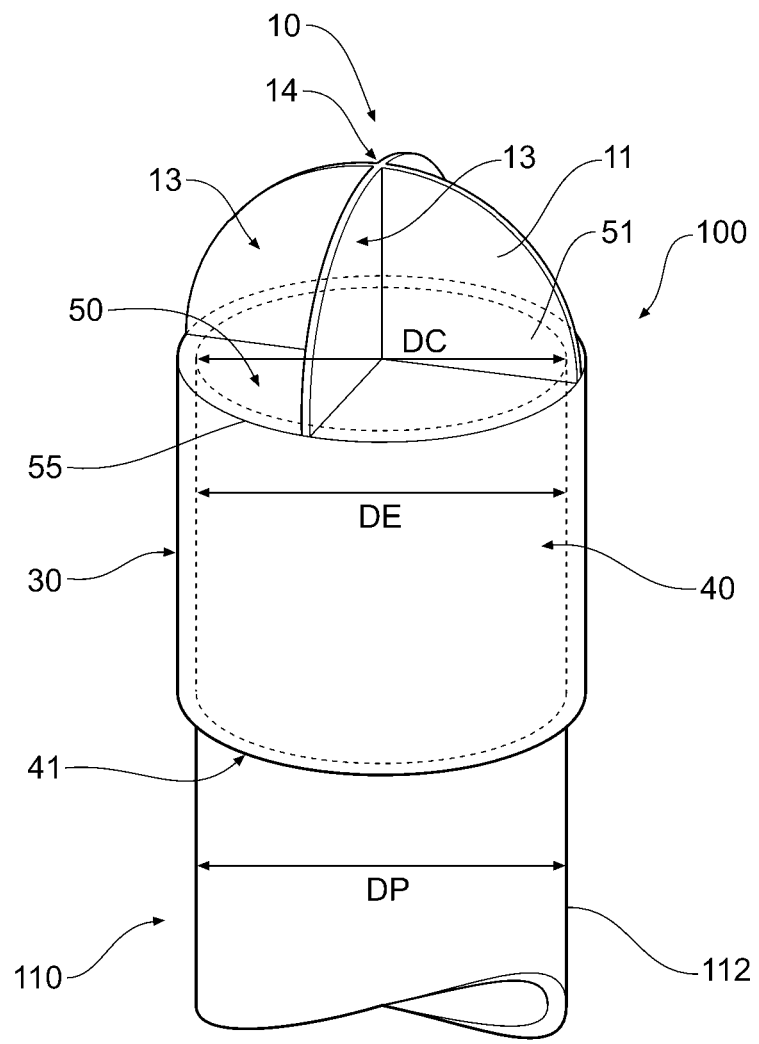
FIG. 8 is a perspective view of an embodiment of an indicator cap installed on a pipe penetration, where a means for aiding in location of the indicator cap is a projection comprising two flaps.
Figure 9:
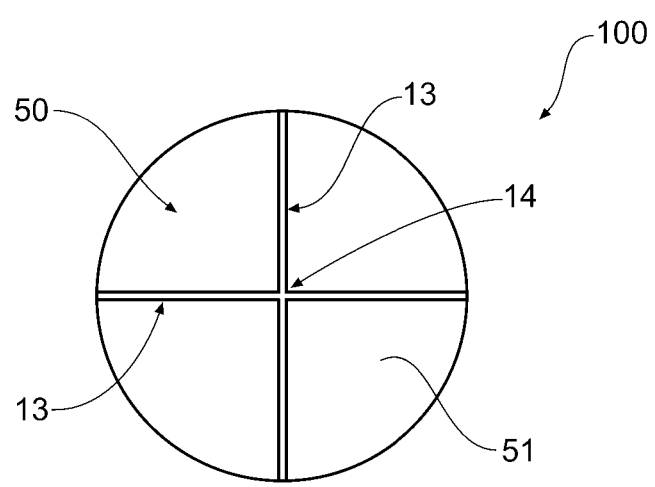
FIG. 9 is a plan view of the indicator cap of FIG. 8.

In an alternative embodiment, referring now to FIGS. 6 and 7, the projection 11 comprises at least one flap 13. The flap 13 being deformable so as to not impede screeding thereover, and resilient so as to recover post screeding. FIGS. 8 and 9 illustrate a further embodiment of the projection 11 comprising two flaps 13, the two flaps 13 may be arranged on the surface 51 of the capping portion 50 such that they cross each other at an apex 14.

Figure 10:
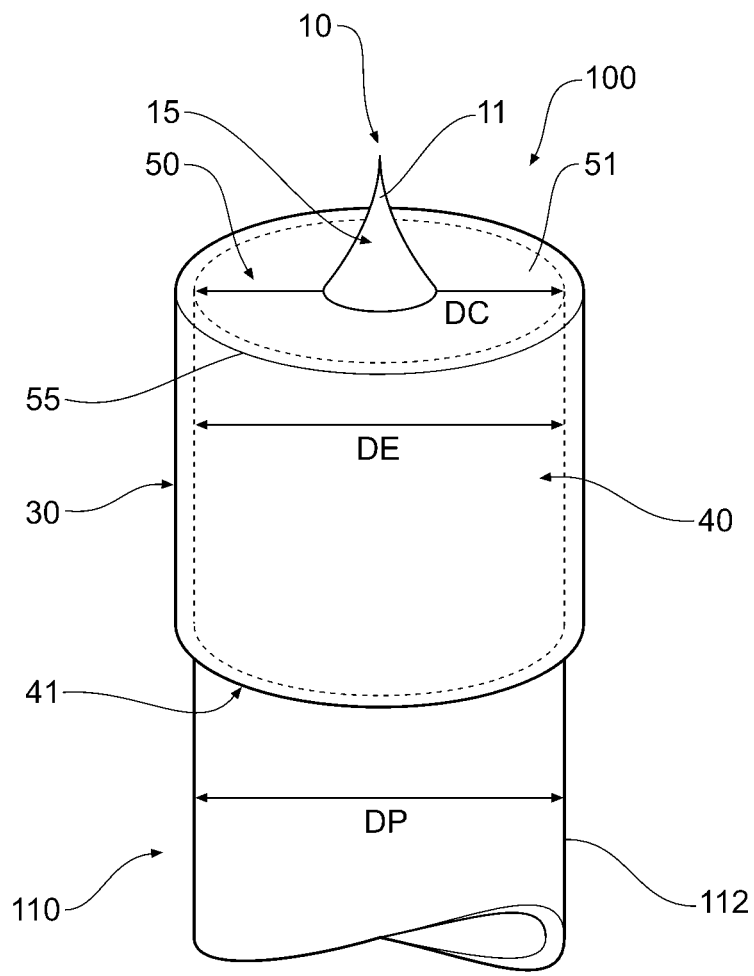
FIG. 10 is a perspective view of an embodiment of an indicator cap installed on a pipe penetration, where a means for aiding in location of the indicator cap is a conical projection.

In an alternative embodiment, referring now to FIG. 10, the projection 11 may be conical 15. The conical projection 15 being deformable so as to not impede screeding thereover, and resilient so as to recover post screeding.

Figure 11:
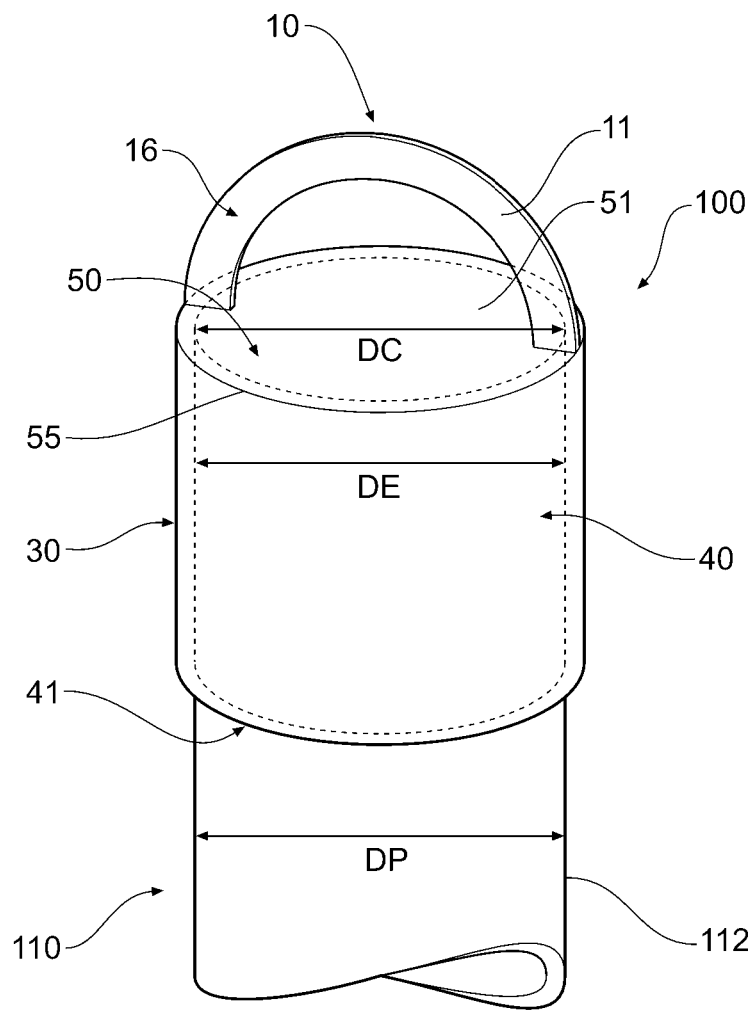
FIG. 11 is a perspective view of an embodiment of an indicator cap installed on a pipe penetration, where a means for aiding in location of the indicator cap is a projection comprising a semicircular loop.

In an alternative embodiment, referring now to FIG. 11, the projection 11 may be semicircular 16. The semicircular 16 projection 11 being deformable so as to not impede screeding thereover, and resilient so as to recover post screeding.

Figure 13:
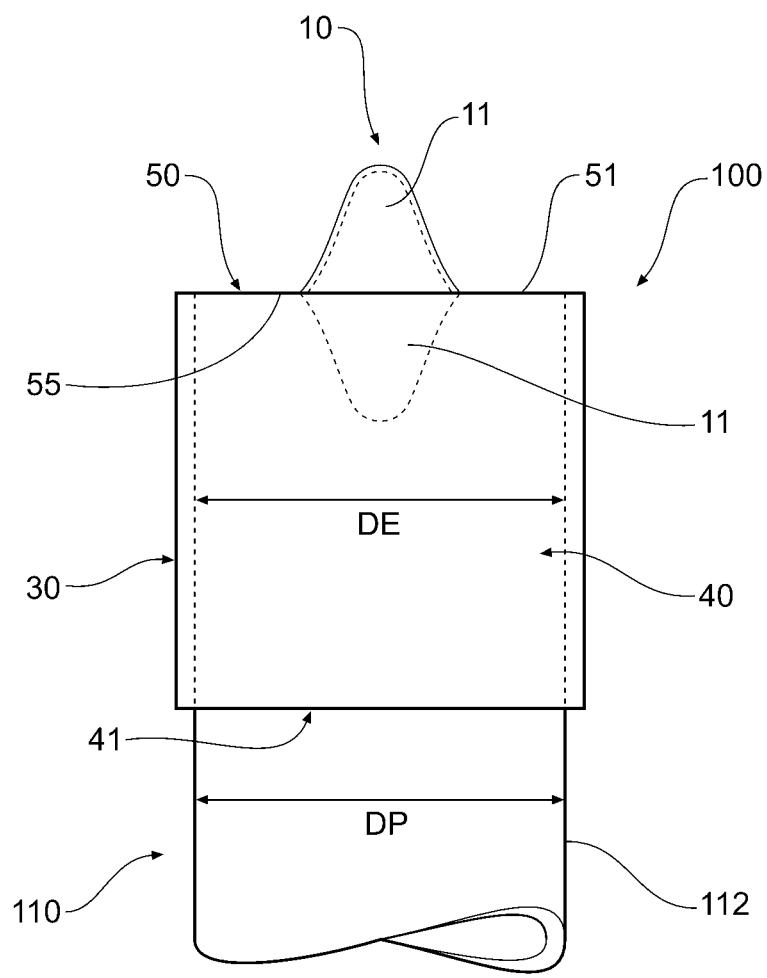
FIG. 13 is a side view of an embodiment of an indicator cap installed on a pipe penetration, where a means for aiding in location of the indicator cap is a resilient projection depressible below a surface of a capping portion of the indicator cap.

In an alternative embodiment, referring now to FIG. 13, the projection 11 may deform by depressing below the surface 51 of the capping portion 50 so as to not impede screeding thereover, and resilient so as to recover post screeding.

In an alternative embodiment, referring now to FIGS. 18 and 19, the projection 11 may comprise a pull tab 17. The pull tab 17 may comprise a handle part 18, such as an aperture, to be gripped by the finger of a user. In this way, the pull tab 17 permits easier removal of the capping portion 50 in order to expose the open end 111 of the pipe 110 post screeding. In this particular embodiment, the pull tab 17 being deformable so as to not impede screeding thereover, and resilient so as to recover post screeding.

Referring to the Figures, it will be appreciated that for any one of the projections 11, that the projection 11 may be deformable laterally. In an alternative, it will be appreciated that for any one of the projections 11, that the projection may be deformable axially.

Referring to the Figures, it will be appreciated that for any one of the projections 11, the means for aiding location 10, the projection 11 may be centrally disposed on the surface 51 of the capping portion 50. Furthermore, it will be appreciated that for any one of the projections 11, the projections 11 may extend perpendicularly from the surface 51 of the capping portion 50.

Figure 12:
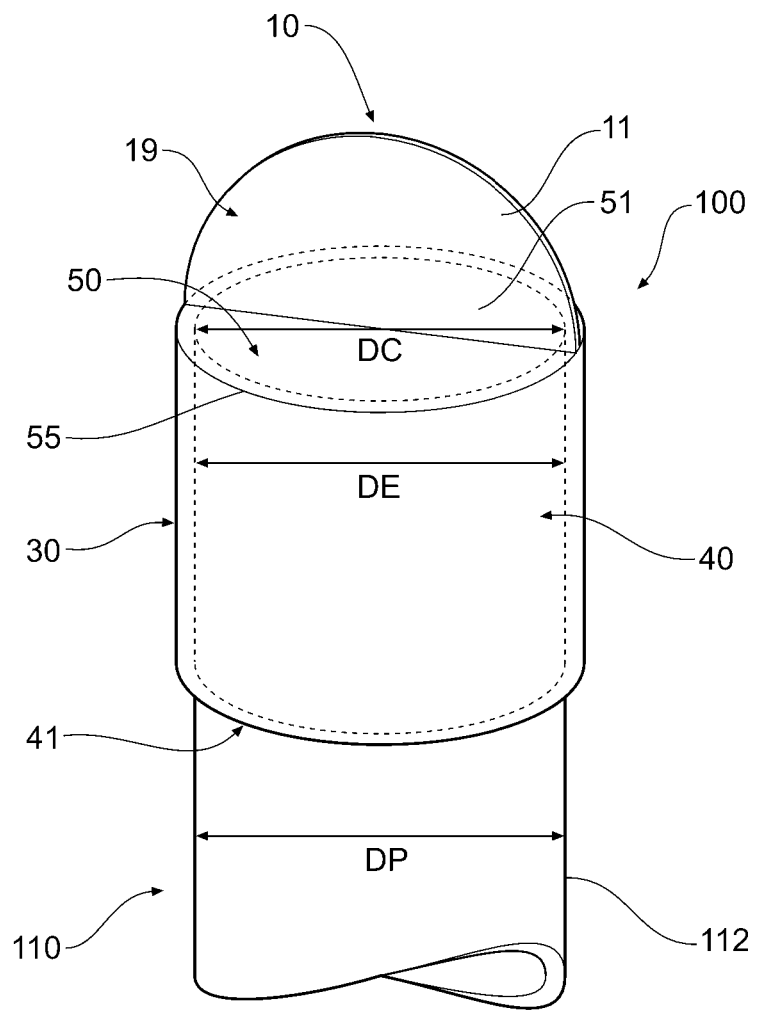
FIG. 12 is a perspective view of an embodiment of an indicator cap installed on a pipe penetration, where a means for aiding in location of the indicator cap is a hemispherical projection.

Referring to FIG. 12, in one embodiment, the means for aiding location 10 may comprise a hemispherical projection 19. The hemispherical projection 19 may have a diameter in accordance with the pipe capping diameter (DC) of the capping portion 50. The hemispherical projection 19 may be manufactured of the resilient material so as to not impede screeding thereover, and thereby indicating the position of the cap 100 and thus the pipe 110 post screeding.

Figure 16:
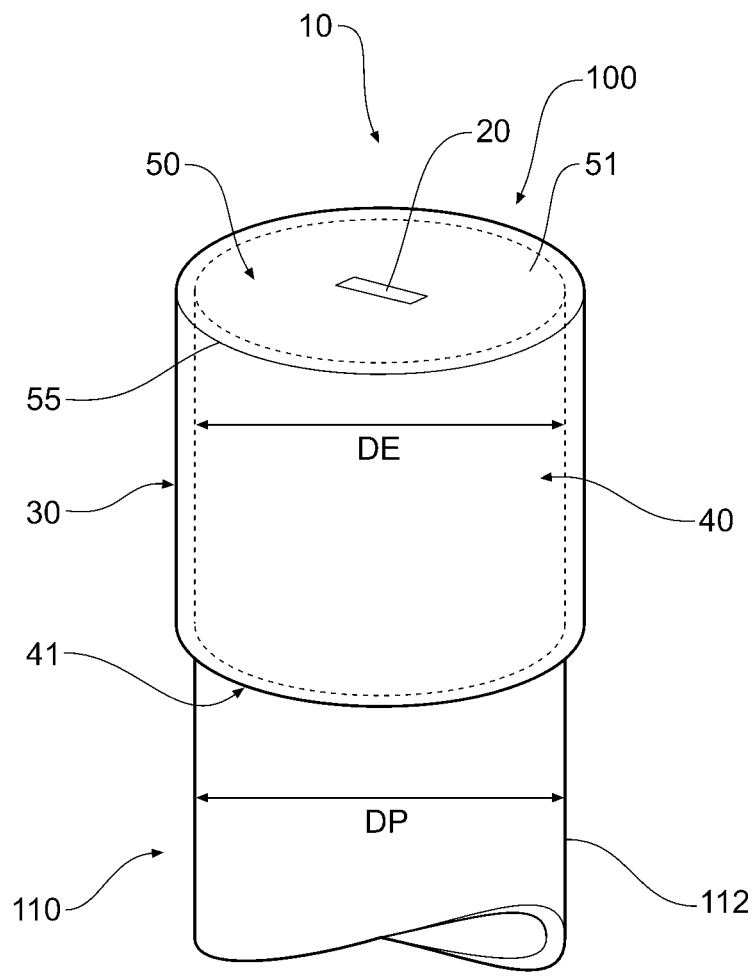
FIG. 16 is a perspective view of an embodiment of an indicator cap installed on a pipe penetration, where a means for aiding in location of the indicator cap is a magnet or a chip, the magnet or the chip being flush with a surface of a capping portion of the indicator cap.
Figure 17:
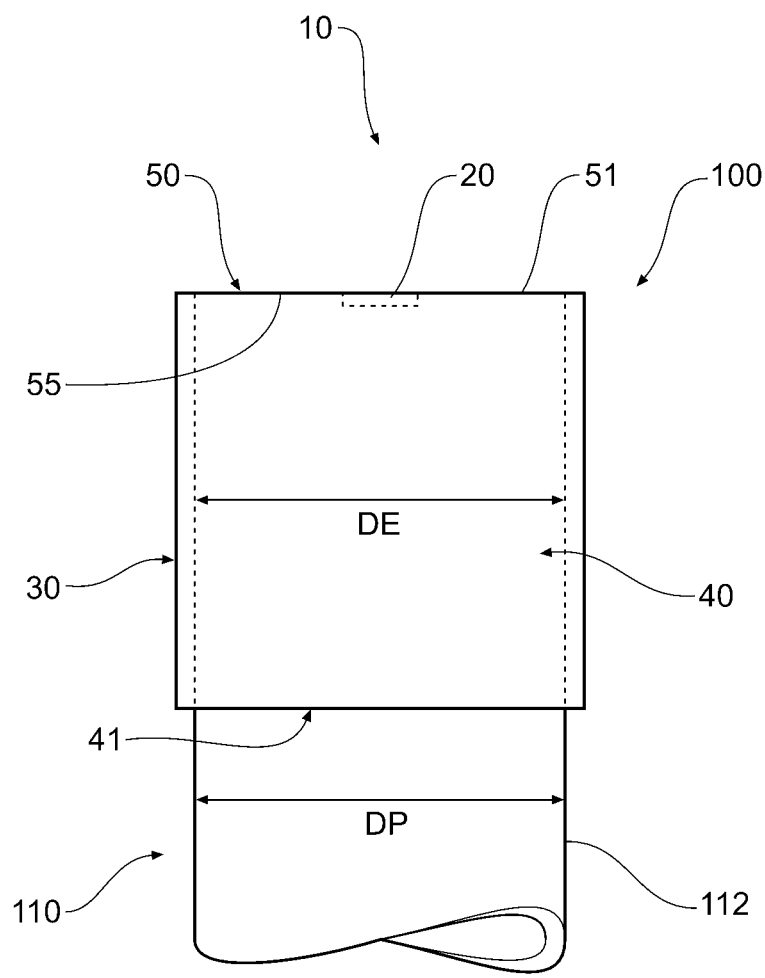
FIG. 17 is a side view of the indicator cap of FIG. 16.

Referring to FIGS. 16 and 17, in one embodiment, the means for aiding location 10 may be flush with the surface 51 of the capping portion 50. In this particular embodiment, the means for aiding location 10 may be a magnet 20. The magnet 20 being flush with the surface 51 of the capping portion 50 so as to not impede screeding thereover, and the magnet 10 providing a magnetic force for indicating the position of the cap 100 and thus the pipe 110 post screeding. The magnetic force is advantageously detectable by (for example) a metal detector (not shown) or any other magnetic material that can be used to observe a magnetic deflection, thereby allowing the means for aiding location 10 to indicate the position of the cap 100 and thus the pipe 110 post screeding. In this embodiment, a further advantage is that the poured cement of the concrete slab (not shown) can be screeded over the cap 100 and thus the pipe penetration 110 without any deflection. Additionally in this embodiment, it will be appreciated that the means for aiding location 10 may alternatively be another metal or material capable of providing a force or signal detectable by (for example) the metal detector.

In an alternative embodiment, the means for aiding location 10 may be a chip (not shown), such as an RFID chip. The chip may provide a detectable signal thereby indicating the position of the cap 100 and thus the pipe 110 post screeding. The detectable signal is advantageously detectable by a receiver (not shown), thereby allowing the means for aiding location 10 to indicate the position of the cap 100 and thus the pipe 110 post screeding. It will be appreciated that in this embodiment, the chip is also flush with the surface 51 of the capping portion 50 so as to not impede screeding thereover. Additionally, in this embodiment, it will be appreciated that the means for aiding location 10 may be the projection 11 described in any one of the embodiments above, whereby the projection 11 further comprises the RFID chip embedded therein.

Referring to the Figures, in one embodiment, the means for aiding location 10 may be integrally formed with the cap body 30.

Referring to the Figures, in an alternative embodiment, the means for aiding location 10 may be separately formed from the cap body 30.

Figure 14:
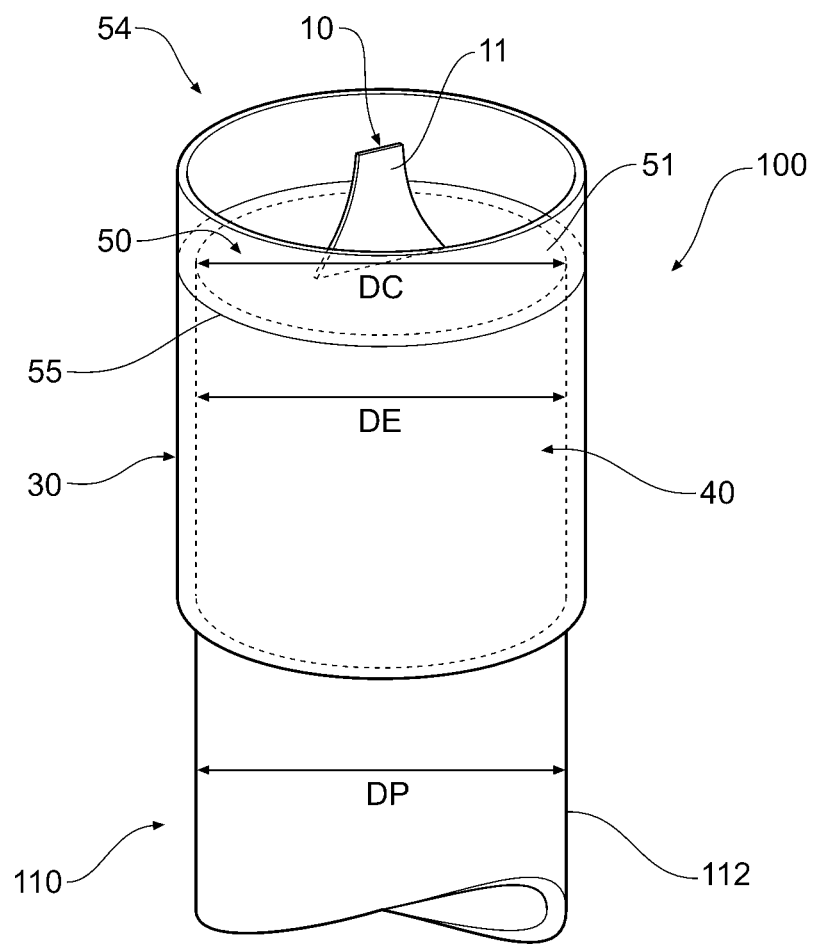
FIG. 14 is a perspective view of an embodiment of an indicator cap installed on a pipe penetration, where a side wall perpendicularly extends from a circumferential edge of a capping portion of the indicator cap.
Figure 15:
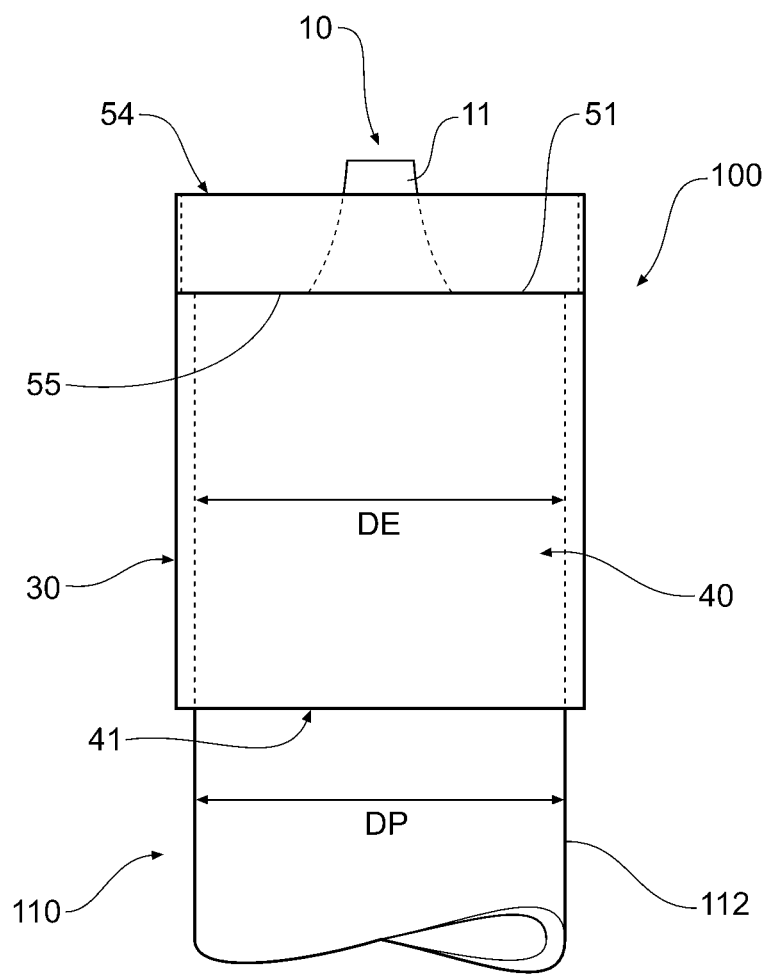
FIG. 15 is a side view of the indicator cap of FIG. 14.

Referring now to FIGS. 14 and 15, in one embodiment, a side wall 54 may perpendicularly extend from a circumferential edge 55 of the capping portion 50. The side wall 54 may be substantially circular and comprise a diameter in accordance with the capping diameter (DC) of the capping portion 50. In this way, the side wall 54 acts as a barrier to advantageously deter screeded cement from settling on the surface 51 of the capping portion 50. A further advantage of the side wall 54 is that it permits easier removal of the capping portion 50 in order to expose the open end 111 of the pipe 110 post screeding, as there will not be a requirement to clean cement off from the surface 51 of the capping portion 50.

In this particular embodiment, it will be appreciated that a height at which the side wall 54 perpendicularly extends from the circumferential edge 55 of the capping portion 50 is less than a height of the means for aiding location 10. In this way, the side wall 54 does not prevent the means for aiding location 10 from being adapted so as to not impede screeding thereover, and to indicate the position of the cap 100 and thus the pipe 110 post screeding.

Additionally in this particular embodiment, it will further be appreciated that the side wall 54 may be particularly adapted so as to not impede screeding thereover, similar to the means for aiding in location 10.

In an alternative embodiment, referring again to FIGS. 14 and 15, the means for aiding location 10 may be the pull tab 17 (as illustrated in FIGS. 18 and 19) advantageously permitting the user to pull the means for aiding location 10, thereby pulling the surface 51 to a height above the height of the side wall 54 permitting easier removal of the capping portion 50 in order to expose the open end 111 of the pipe 110 post screeding.

Referring to any one of the Figures, in one embodiment, the engagement portion 40 of the cap body 30 may be snugly, abuttingly, adhesively or threadingly engaged with the pipe projection 110. In this way, the engagement portion 40 may be suited to engage either/or the exterior 112 or the interior 113 of the pipe 110 to engage the indicator cap 100 to the pipe 110. The engagement portion 40 engages one of the exterior 112 or interior 113 of the pipes 110 based on the selection of the pipe engaging diameter (DE) in accordance to the diameter of the pipe (DP).

Figure 23:
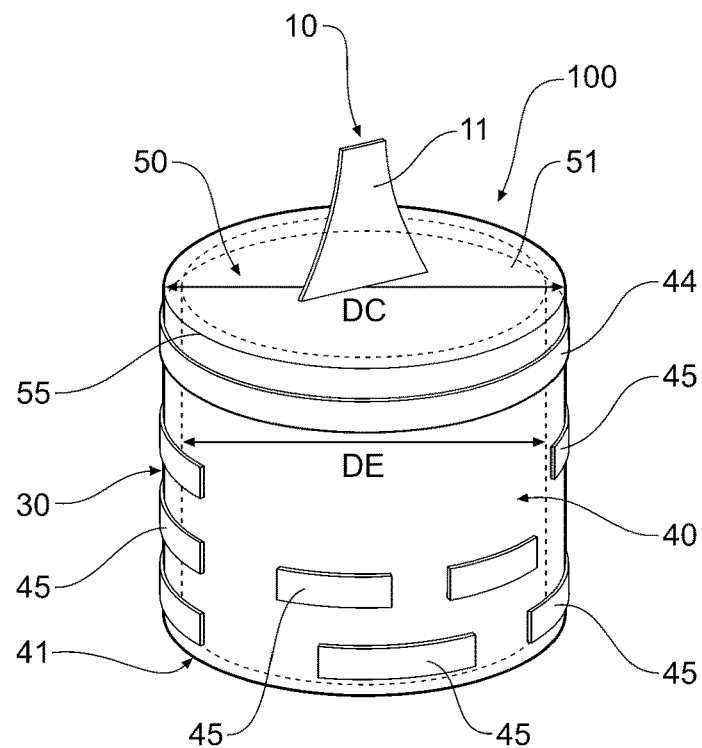
FIG. 23 is a perspective view of an embodiment of an indicator cap, where an engagement portion of the indicator cap comprises ribbed sections.

Referring now to FIG. 23, in one embodiment, the engagement portion 40 of the cap body 30 may comprise one or more ribs 44 to snugly engage with the interior 113 of the pipe 110, thereby advantageously enhancing the engagement between the indicator cap 100 and the pipe 110.

In an alternative to above, it will be appreciated that an interior (not shown) of the engagement portion 40 of the cap body 30 may comprise the one or more ribs 44. In this way, the one or more ribs 44 may be particularly designed so as to snugly engage with the exterior 112 of the pipe 110, thereby advantageously enhancing the engagement between the indicator cap 100 and the pipe 110.

Referring still to FIG. 23, in one embodiment, the engagement portion 40 of the cap body 30 may comprise one or more threads 45 to threadingly engage with the interior 113 of the pipe 110, thereby advantageously enhancing the engagement between the indicator cap 100 and the pipe 110. It will be appreciated that the engagement portion 40 may comprise a combination of both the one or more ribs 44 and the one or more threads 45 to advantageously enhance engagement between the indicator cap 100 and the pipe 110.

In an alternative to above, it will be appreciated that the interior of the engagement portion 40 of the cap body 30 may comprise the one or more threads 45. In this way, the one or more threads 45 may threadingly engage with the exterior 112 of the pipe 110, thereby advantageously enhancing the engagement between the indicator cap 100 and the pipe 110. It will be further appreciated in this embodiment that the interior of the engagement portion 40 may comprise a combination of both the one or more ribs 44 and the one or more threads 45 to advantageously enhance engagement between the indicator cap 100 and the pipe 110.

Referring to any one of the Figures, in one embodiment, the indicator cap 100 may advantageously be produced in a variety of highly visual colours, thereby allowing easy identification of the pipe 110 via the visually bright colour of the cap 100.

In one embodiment, the cap body 30 of the indicator cap 100 may also be manufactured of the resilient material. In this way, both the resilient projection 10 and the indicator cap 100 are manufactured of the same material, advantageously for ease of manufacture.

In an alternative embodiment, the cap body 30 of the indicator cap 100 may be manufactured of a polymeric material. Additionally, the projection 10 of the indicator cap 100 may also be manufactured of the polymeric material in this embodiment, in this way both the projection 10 and the cap body 30 are manufactured of the same material, advantageously for ease of manufacture.

In one embodiment, the resilient material may comprise an elastomeric material. In an alternative, the resilient material may comprise one or more polymeric materials.

In any one of the above embodiments, it will be appreciated that the resilient material of the indicator cap 100 (particularly on the surface 51 of the capping portion 50) may comprise sufficient integrity to withstand a number of working loads thereon.

Figure 24:
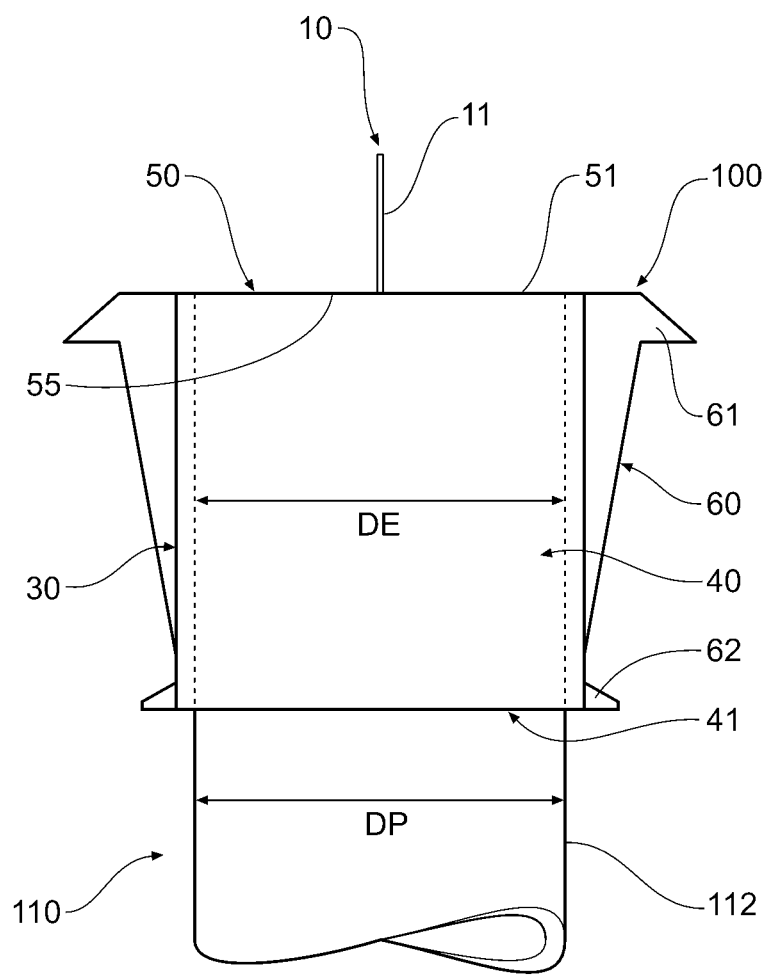
FIG. 24 is a side view of an embodiment of an indicator cap, where a receiving portion peripherally formed about an engagement portion of the indicator cap.

Referring now to FIG. 24, in one embodiment, the indicator cap 100 may further comprise one or more tabs 62, wherein the tabs 62 are positioned at the end 41 of the engagement portion 40, and the tabs 62 may extend outward from the engagement portion 24 as illustrated. The one or more tabs 62 being particularly designed so as to be covered by cement during screeding, in this way, advantageously the one or more tabs 62 may assist in ensuring that the indicator cap 100 is secured to the pipe penetration 110. Additionally, the one or more tabs 62 may be formed of the resilient material such that the one or more tabs 62 are inherently resilient. In this way, it will be appreciated that once the one or more tabs 62 are covered by cement post screeding, the one or more tabs 62 may advantageously assist in the removal of the indicator cap 100 from the pipe projection 110 post screeding and setting of cement, by the application of an upward force on the indicator cap 100.

Referring still to FIG. 24, in one embodiment, the indicator cap 100 may further comprise a receiving portion 60, wherein the receiving portion 60 may be peripherally formed about the engagement portion 40 of the indicator cap 100. The receiving portion 60 may extend from and be tapered about the engagement portion 40, as illustrated in FIG. 24, whereby the receiving portion 60 may be particularly designed to comprise a cavity to receive one of either a plumbing device or a puddle flange (not shown) therein. In one embodiment, a portion of the receiving portion 60 may require to be cut in order to expose the cavity in order to permit the receiving portion 60 to receive either the plumbing device or the puddle flange therein. In this way, advantageously the receiving portion 60 initially, prior to the portion being cut, may prevent cement from settling within the cavity.

In the above embodiment, it will be appreciated by those skilled in the art that the receiving portion 60 may be used prior to and post screeding. By way of a first example, prior to screeding, the operator may install the plumbing device or the puddle flange by inserting a portion of the plumbing device or the puddle flange in the receiving portion 60, and subsequently perform screeding operations and subsequently use the means for aiding in location 10 to indicate the position of the cap 100 and thus the pipe 110. It will be appreciated that in this first example, the plumbing device or the puddle flange received in the receiving portion 60 advantageously permits the means for aiding in location 10 to operate such that it does not impede screeding thereover. By way of a second example, post screeding and setting of the cement slab, the capping portion 50 of the indicator cap 100 may be cut and removed using a cutting means (not shown) so as to expose the open end 111 of the pipe 110, and subsequently the operator may install either the plumbing device or puddle flange by inserting a portion of the plumbing device or the puddle flange in the receiving portion 60.

In the above embodiment, the receiving portion 60 may be manufactured of the resilient material. In this way, the receiving portion 60 may be flexible and resilient so as to securely receive the plumbing device or puddle flange therein. It will be appreciated by those skilled in the art, being manufactured of the resilient material provides the receiving portion 60 with the advantage of stretching to a size and shape so as to securely receive the plumbing device or puddle flange therein.

Still referring to the above embodiment, it will be appreciated by those skilled in the art that the plumbing device or the puddle flange are known devices used by operators in the construction process in wet areas to provide water drainage areas, water proofing purposes and various other plumbing related services. Advantageously, in the embodiment wherein the indicator cap 100 comprises the receiving portion 60, the operator may easily and readily install the plumbing device or puddle flange to the pipe penetration 110 by virtue of the receiving portion 60 without the requirement for further modification to the pipe 110 for example by chiseling or use of a further pipe connection piece (not shown).

Referring still to FIG. 24, in one embodiment, the receiving portion 60 may further comprise an outwardly extending lip 61, wherein the lip 61 extends outwardly from the receiving portion 60 as illustrated in FIG. 24. The lip 61 may be manufactured of the resilient material and may be integrally formed with the receiving portion 60. In use, post screeding and setting of the cement slab, the lip 61 may be substantially or at least partially covered by the cement. In this way, it will be appreciated by those skilled in the art, that the outwardly extending lip 61 may permit the operator to easily break/remove off excess cement set about the lip 61, thereby allowing the operator to cut and remove the capping portion 50 and/or the portion of the receiving portion 60 of the indicator cap 100.

During the construction process, pipe penetrations 110 are left exposed for subsequent connection. Often these exposed pipes 110 are left exposed above the concrete slab (not shown) for access to services, not limited to, plumbing or electrical. In any one of the embodiments, the open end 111 of the pipe 110 may extend a length beyond the surface of the concrete slab. However, it will be appreciated that these pipes 110 may be trimmed such that the open end 111 is level with the surface of the concrete slab, such that the indicator cap 100 of any one of the embodiments may be used thereon. It will also be appreciated by those skilled in the art that the pipe 110 may be trimmed such that the open end 111 is above or below the level of the surface of the concrete slab, in this way, the indicator cap 100 of any one of the embodiments discussed above may be selected for use thereon. It will be additionally appreciated by those skilled in the art, that ideally the pipe 110 is to be trimmed such that the open end 111 is level with or below the level of the surface of the concrete slab, so as to permit the indicator cap 100 of any one of the above embodiments used thereon provides all of its advantages in use. Furthermore, it will be appreciated by those skilled in the art, that the indicator cap 100 of any one of the above embodiments in use may provide a number of advantages should the open end 111 of the pipe 110 be level with or below the level of the surface of the concrete slab.

An exemplary method for screeding cement over and locating the pipe penetration 110 by use of the indicator cap 100 of any one of the embodiments, may comprise the steps of:

a. Trimming or cutting the pipe projection 110 such that the open end 111 of the pipe projection 110 is level with, below, or near level to the intended surface of the concrete slab (not shown) or a finished floor level (not shown);

b. Selecting an indicator cap 100 where at least one of the pipe engaging diameters (PE) or the pipe capping diameter (DC) is in accordance with the diameter of the pipe (DP);

c. Installing the indicator cap 100 of any one of the embodiments disclosed on the pipe projection 110;

d. Pouring the cement required to form the concrete slab;

e. Screeding the cement to form the intended surface of the concrete slab including screeding over the indicator cap 100, and thus the pipe 110;

f. Allowing time for the concrete slab to cure; then g. Using the means for aiding location 10 to locate the indicator cap 100, and thus the pipe 110; and then h. Cutting the capping portion 50 of the indicator cap 100 using a cutting means (not shown) to expose the open end 111 of the pipe 110, thereby providing a means for subsequent connection (not shown) or access to the pipe 110.

It will be appreciated by those skilled in the art, that at step "h" of the method above, that the cutting means is selected in accordance with the material that the cap body 50 is comprised of. As disclosed above, the cap body 50 may be comprised of the resilient material, in this instance a Stanley knife (or a similar cutting apparatus) may be used to cut the capping portion 50 to provide the means for subsequent connection or access of the pipe 110.

It will also be appreciated by those skilled in the art, that as an alternative at step "h" of the method above, whereby the indicator cap 100 comprises the one or more tabs 62, the indicator cap 100 may be removed from the pipe 110 post screeding and setting of cement by the application of an upward force. In this way, the open end 111 of the pipe 110 is exposed to provide the means for subsequent connection or access to the pipe 110, without cutting the capping portion 50 of the indicator cap using the cutting means.

An advantage at step "e" of the method above may become apparent to those skilled in the art, that the use of the indicator cap 100 wherein the means for aiding location 10 is any one of the embodiments of the projection 11 comprised of the resilient material, assists in clearing cement (that is, the screeded material) from the surface 51 of the capping portion 50. That is, during the screeding process, the resilience of the projection 11 may deter screeded cement from settling on the surface 51 of the capping portion 50 by its inherent advantage to recover post screeding, thereby removing/preventing cement from settling on the surface 51 of the capping portion 50. In this way, as will be appreciated by those skilled in the art, the indicator cap 100 further aids to locate the indicator cap 100 (and thus the pipe 110), particularly so in the instance that the indicator cap 100 is produced in a highly visible colour and a powered concrete levelling device (such as a helicopter trowelling machine, not shown) is used at step "e" to screed the cement. Thus, the resilience of the projection 11 advantageously permits easier removal of the capping portion 50 in order to expose the open end 111 of the pipe 110 post screeding, as there will not be a requirement to clean cement off from the surface 51 of the capping portion 50. That is, it may be appreciated, by the resilience of the projection 11 the surface 51 of the indicator cap 100 comprises an inherent "self cleaning" function.

Additionally, it will be appreciated by those skilled in the art that the method disclosed above, advantageously reduces the amount of time spent screeding the cement slab to produce the intended surface as an operator is no longer required to navigate the pipe projections 110, as with the use of the indicator cap 100, pipe projections 110 are flush with the surface of the cement slab. The reduction in time spent screeding further reduces the costs incurred with hiring the operator to screed cement.

Another advantage of the method above is that it reduces the likelihood of a non-level cement slab surface around the periphery of the pipe projections 110, as the pipe projections 110 are cut or trimmed such that the open end 111 is level with the surface of the cement slab. Thereby, the use of the indicator cap 100 assists in resulting in a more visually pleasing and level concrete slab surface.

Another inherent advantage provided by the indicator cap 100, in use, reduces the likelihood of the operator unintentionally damaging the pipe projections 110 during the screeding process. This is due to the pipe projections 110 being cut or trimmed such that the open end 111 is level with the intended surface of the cement slab, thereby reducing the likelihood of requirement of repair and recover to the submerged pipes.

Another advantage provided by the indicator cap 100, is that the capping portion 50 connected to the engagement portion 40 covers the open end 111 of the pipe 110. In this way, the potential for wet concrete to enter the open end 111 of the pipe 110 during the pouring or screeding of concrete is mitigated.

A further advantage provided by the use of the indicator cap 100, is that the pipe projections 110 are cut or trimmed such that the open end 111 is at or near the intended surface of the cement slab, this reduces the likelihood of trip hazards on the concrete slab post the screeding operation, thus leading to a reduction in foot, shin, ankle and other injuries as a result of contact with the pipe penetrations 110.

The reference to any prior art in this specification is not, and should not be taken as, an acknowledgement of any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. An indicator cap for a pipe penetration, the indicator cap comprising a cap body, wherein the cap body comprises an engagement portion for engaging the indicator cap with the pipe, and a capping portion connected to the engagement portion for covering an open end of the pipe, wherein the engagement portion extends substantially perpendicularly from the capping portion to an end connected to a flange, and
wherein a surface of the capping portion supports a means for aiding location of the indicator cap and thus the pipe, wherein the means for aiding location is adapted so as to not impede screeding thereover, and to indicate the position of the cap and thus the pipe post screeding.

2. The indicator cap of claim 1, wherein the cap body is substantially circular.

3. The indicator cap of claim 2, wherein the engagement portion is substantially circular, and comprises a pipe engaging diameter, and the capping portion is substantially circular, and comprises a pipe capping diameter.

4. The indicator cap of claim 3, wherein the pipe engaging diameter is substantially the same as the pipe capping diameter, wherein the pipe engaging diameter is selected in accordance with a diameter of the pipe.

5. The indicator cap of claim 3, wherein the pipe engaging diameter is less than the pipe capping diameter, wherein the pipe engaging diameter is selected in accordance with a diameter of the pipe.

6. The indicator cap of claim 3, wherein the pipe engaging diameter is greater than a diameter of the pipe.

7. The indicator cap of claim 1, wherein in use, the capping portion and the engagement portion cooperatively form a cavity for receiving the open end of the pipe therein.

8. The indicator cap of claim 1, wherein the engagement portion and the capping portion are adapted to define a peripherally circumferential lip, substantially at the capping portion.

9. The indicator cap of claim 8, wherein in use, the circumferential lip bears against the open end of the pipe, and the engagement portion is nested and concealed in a cavity of the pipe.

10. The indicator cap of claim 1, wherein the engagement portion may be snugly, abuttingly, adhesively or threadingly engaged with the pipe projection.

11. The indicator cap of claim 1, wherein the flange is substantially circular and comprises a flange diameter, and the flange diameter is greater than both the pipe engaging diameter and the pipe capping diameter.

12. The indicator cap of claim 1, wherein the flange is comprised of a meshed material.

13. The indicator cap of claim 1, wherein the means for aiding location comprises a projection, wherein the projection is comprised of a resilient material.

14. The indicator cap of claim 13, wherein the resilient projection is both deformable so as to not impede screeding thereover, and resilient so as to recover post screeding.

15. The indicator cap of claim 14, wherein the resilient projection deforms by depressing below the surface of the capping portion so as to not impede screeding thereover, and resilient so as to recover post screeding.

16. The indicator cap of claim 1, wherein the means for aiding location is manufactured of the resilient material, whereby the means for aiding location assists in removing or preventing a screeded material from settling on the surface of the capping portion of the indicator cap.

17. A method for screeding cement over and locating a pipe projection by use of the indicator cap of claim 1, the method comprising the steps of: cutting the pipe projection such that an open end of the pipe projection is level with an intended surface of a concrete slab, installing the indicator cap on the pipe projection, pouring cement required to form the concrete slab, screeding the cement to form the intended surface of the concrete slab including screeding over the indicator cap, allowing time for the concrete slab to cure, then using the means for aiding location to locate the indicator cap and thus the pipe, and then cutting the capping portion of the indicator cap using a cutting means to expose the open end of the pipe, thereby providing a means for subsequent connection or access to the pipe.

18. The indicator cap of claim 3, wherein the means for aiding location comprises a hemispherical projection, wherein the hemispherical projection has a diameter in accordance with the pipe capping diameter, the hemispherical projection being manufactured of a resilient material so as to not impede screeding thereover, and thereby indicating the position of the indicator cap and thus the pipe post screeding.

* * * * *